Patented Dec. 2, 1947

2,431,792

UNITED STATES PATENT OFFICE 2,431,792

TREATMENT OF PETROLEUM OILS

Nicholas J. Datesh and John N. Datesh, Dormont, Pa.

No Drawing. Application February 7, 1945, Serial No. 576,703

4 Claims. (Cl. 252—331)

The invention relates generally to the Treatment of petroleum oils for breaking up oil-water emulsions and more particularly to the treatment of fuel oils for separating out the water content therein and breaking up or removing the sludge which accumulates in storage tanks, heating vessels and feed lines for fuel oils; and this application is a continuation in part of our copending application Serial No. 531,988, filed April 20, 1944.

The novel compound or composition of matter, to which this invention relates, distinguishes from other preparations which merely break up oil-water emulsions, in that our compound acts to remove sludge, prevents its formation, and reduces the tendency of the fuel oil to cause carbon accumulation in the tanks, pipes and burners; in addition to breaking up oil-water emulsions.

Oil-water emulsions are present in fuel oil due to incomplete removal of water therefrom during refining, and to absorption of water caused by sweating in storage tanks. This emulsion is normally stable because of the presence of emulsifying agents and probably because of electrical charges carried by the water globules, so that the oil and water do not separate by gravity alone.

Fuel oil contains carbon and asphaltum or tar particles which form a gummy mass commonly known as sludge, and this sludge absorbs water and causes heavy deposits on the walls of the storage tanks, feed lines, preheaters and burners in fuel oil systems.

Our novel composition contains certain organic compounds which not only aid in breaking up the emulsions but also act as solvents for some of the asphaltum and tarry materials commonly found in fuel oils, which materials ordinarily reduce the fuel value or efficiency of the oils.

The stability of the oil water two phase emulsion is believed to be attributable to the electro-colloidal activity of small clusters of oil and water globules, to the high surface and interfacial tensions of the oil, and to the presence of emulsion stabilizing materials found in the oils. The problem of breaking down these oil-water emulsions involves the selection of demulsifiers which contain substances capable of reducing the surface and interfacial tensions; substances which will neutralize the electrical charges; and materials which will dissolve or counteract the emulsion stabilizing substances.

Certain prior preparations are capable of performing these functions to a substantial extent, and may be satisfactory for treating field oil emulsions where settling, filtering or centrifuging methods are sometimes practical, and where such methods do not produce other disadvantages.

However, in the treatment of fuel oils, additional factors must be considered and additional problems must be solved. The grouping of the electrically charged oil globules causes impurities such as asphaltum, tarry and resinous particles to be entrapped in the emulsion, contributing materially to the formation of sludge. When demulsification of such oils is brought about, some of these foreign substances may remain in colloidal suspension, whereas others may coalesce and settle, causing sludge formation in the bottom of the tanks and feed lines, and this may subsequently result in carbon formation in preheater lines if a high enough temperature is encountered.

The presence of colloidally suspended foreign substances tends to cause an increase in the viscosity of the oil, which is an objectionable condition in fuel oil combustion, and to cause carbon to accumulate at the burners.

Thus, in addition to ordinary demulsification, the conditioning of fuel oils requires treatment of the oil to dissolve, remove or counteract the objectionable foreign particles entrapped in the emulsion; to reduce the viscosity of the oil, to bring about rapid demulsification preventing settling of sludge forming particles, to remove accumulated deposits in the tanks and lines and at the burners, and to eliminate the necessity of centrifuging.

In heating vessels, the deposits or formations of sludge decrease the efficiency of heat transfer and cause clogging in the feed lines and at the burners. Moreover, the increased viscosity of the oil, due to the presence of sludge requires more power for pumping it through the feed lines to the burners.

It is therefore an object of the present invention to provide a novel composition or chemical compound for treating fuel oil which will break up or demulsify the oil-water emulsions contained therein.

Another object is to provide a novel composition for demulsifying fuel oil which also acts to prevent sludge formation.

A further object is to provide a novel composition for demulsifying fuel oil which also removes and prevents accumulated deposits in storage and heating vessels, in feed lines, and at the burners.

Another object is to provide a novel composition for treating fuel oil which acts to decrease its viscosity and to improve combustion.

A still further object is to provide a novel composition for treating fuel oil which simultaneously accomplishes all of the foregoing objectives.

These and other objects are accomplished by treating field oil with the novel composition comprising the present invention, which is hereinafter set forth in detail and defined in the appended claims.

The novel and improved composition or chemical compound which we have discovered is especially adapted for treating fuel oils, but can also be used in treating oil field oils, and preferably consists of the following ingredients in approximately the proportions given:

| | Parts by weight |
|---|---|
| Phenol | 3 |
| Cresylic acid | 8 |
| Benzol | 3 |
| Tar acid oil | 75 |
| Ammonium linoleate | 1 |
| Ethyl alcohol | 3 |
| Ethylene dichloride | 7 |

We have found that methyl, propyl or butyl alcohol may be used in place of ethyl alcohol with equally good results. These alcohols are properly defined as saturated alcohols having not more than four carbon atoms. For treating certain types of fuel oils, pine oil may be substituted for alcohol.

If desired, about 1% of paradichlorobenzene or its equivalent may be added to impart a pleasing odor to the compound.

Chlorinated hydrocarbons which are solvents for tars, resins and gums include ethylene dichloride, and other compatible hydrocarbons of this group may be substituted for the ethylene dichloride.

The novel compound in the approximate proportions given has been found to be very satisfactory, for example in treating a typical No. 6 fuel oil, known as Bunker C oil.

It is to be understood that the proportions of the ingredients can be varied to some extent and still come within the scope of the invention. In practice, slight variations of the proportions may be desirable, because of different characteristics of various types of fuel oil being treated.

In preparing the novel composition, the phenol, alcohol and ammonium linoleate are preferably thoroughly mixed together in the given proportions and heated to about 150° to 180° F. and then allowed to cool. The other ingredients are then added and thoroughly intermixed.

However, we do not intend to limit ourselves to the exact order and manner of mixing the ingredients, as good results in treating fuel oil or tars used as fuel oil are not primarily dependent upon a particular manner of preparing the novel composition.

While all of the ingredients listed are desirable and preferable for obtaining best results in treating fuel oil, we consider that phenol, cresylic acid, benzol, ethylene dichloride or other compatible chlorinated hydrocarbon, and tar acid oil are the more important ingredients for accomplishing the objects of the invention.

The tar acid oil includes either (1) products obtained in coal tar distillation consisting of coal tar oils and coal tar acids, the material having boiling points in the neighborhood of 250° F., commonly made from neutral oils to which have been added coal tar acids; or (2) products obtained from the treatment of acid sludge recovered from the action of sulfuric acid on cracked petroleum distillates, the material having boiling points in the neighborhood of 360° F. The tar acid oil can be made up of neutral oil and cresylic acid, the neutral oil being made from petroleum products and the cresylic acid produced in petroleum distillation.

With respect to the action of the ingredients in our novel composition in treating petroleum oils, we have reason to believe that the following actions or results take place, although we do not wish to be limited by these theories.

The tar acid oil is more effective in breaking up emulsions than are water soluble colloids, because the acids in the tar oil are more readily conveyed to the oil-water interface and hence attack the film of the emulsifying agent more effectively.

Cresylic acid is a mixture of three forms of cresol and contains phenol and higher phenols.

The action of the cresylic acid is due to the formation of salts of cresol and phenol components and to the formation of fatty acids, both of which result from the reaction of the cresols and phenols, which are contained in the cresylic acid, with the ammonium linoleate. The salts of the phenol and cresol components are soluble in mineral oils, and the fatty acids attack the emulsion film. Cresylic acid is believed to be more effective than phenol in this respect.

Benzol and phenol are effective as active ingredients attacking the sludge formed as a result of the carbon and asphaltum materials in the oil, are also useful in removing the carbon deposits, and in dissolving asphaltum materials and certain resins.

Phenol also acts as a demulsifier due to the formation of phenolates and fatty acids resulting from the reaction of phenol with ammonium linoleate. The products of the reaction attack the emulsion film.

Referring to ammonium linoleate, which is the ammonium salt of linoleic acid, this ingredient may be added as such to the composition, or may be formed by adding concentrated ammonia (26% to 50% $NH_3$) and linoleic acid.

We believe that the presence of ammonium linoleate in our novel composition increases the solubility of cresylic acid in water, provides a fatty acid for attacking the emulsion film, and provides a monovalent cation which may function to reduce the stabilizing effect of the electrical charge present in oil-water emulsions.

The alcohols previously referred to are solvents for the impurities in the fuel oil, and aid in demulsification and in controlling the viscosity of the fuel oil.

Ethylene dichloride and other compatible chlorinated hydrocarbons, are solvents for asphaltum, tarry or certain resinous impurities found in fuel oil, which impurities cause sludge and carbon formations in oil storage tanks, heating vessels and feed lines, and cause carbon formation at the burners, thus reducing combustion efficiency.

In the treatment of fuel oils, the amount of the novel composition used varies somewhat according to the nature and the viscosity of the oil being treated, but for treating a typical No. 6 oil the following example is given:

Add about one gallon of the novel composition to each 1000 gallons of fuel oil for the first treatment, or until the sludge is broken up or dissolved, and then add about one gallon of the composition to 2000 gallons of fuel oil for maintenance or continued treatment.

With heavier oils it may be desirable to add about 2 gallons of the novel composition to 1000 gallons of fuel oil for the first treatment and then to add about one gallon to each 1000 gallons for maintenance or continued treatment.

We have also discovered that heating the oil to temperatures of from 50° F. to 180° F. during treatment will aid the demulsifying action of our novel composition.

We have found in actual practice that the use of the novel composition described herein has produced remarkable results in treating fuel oil as used in industrial installations, particularly in preventing the formation of sludge and carbon deposits, as well as removing previously accumulated deposits, in storage tanks, feed lines, preheaters and at the fuel burners, while at the same time reducing greatly the water content of the fuel oil and increasing the fluidity of the oil.

Our novel composition is economical and easily and effectively applied in treating various fuel oils in common use.

We claim:

1. A composition for demulsifying petroleum oils and removing and preventing sludge formation therein, consisting of about 3 parts by weight of phenol, about 8 parts by weight of cresylic acid, about 3 parts by weight of benzol, about 75 parts by weight of tar acid oil, about 1 part by weight of ammonium linoleate, about 3 parts by weight of alcohol, and about 7 parts by weight of ethylene dichloride.

2. A composition for demulsifying fuel oils and removing and preventing sludge formation, consisting of about 75 parts by weight of tar acid oil, about 8 parts by weight of cresylic acid, and about 3 parts by weight of benzol.

3. A composition for demulsifying fuel oils and removing and preventing sludge formation, consisting of about 75 parts by weight of tar acid oil, about 8 parts by weight of cresylic acid, about 3 parts by weight of benzol and about 3 parts by weight of phenol.

4. A composition for demulsifying fuel oils and removing and preventing sludge formation, consisting of about 75 parts by weight of tar acid oil, about 8 parts by weight of cresylic acid, about 3 parts by weight of benzol, and about 3 parts by weight of a saturated alcohol having not more than four carbon atoms.

NICHOLAS J. DATESH.
JOHN N. DATESH.

REFERENCES CITED

The following references are of record in the file of this patent:

UNITED STATES PATENTS

| Number | Name | Date |
|---|---|---|
| 1,660,004 | De Groote | Feb. 21, 1928 |
| 1,882,444 | Peirce et al. | Oct. 11, 1932 |
| 1,940,398 | De Groote et al. | Dec. 19, 1933 |
| 2,353,700 | De Groote et al. | July 18, 1944 |
| 2,365,853 | Agruss et al. | Dec. 26, 1944 |

OTHER REFERENCES

Dunstan et al., "Colloids in Petroleum and in the Petroleum Industry," in Journal of the Society of Chemical Industry, vol. XLIV, page 439, Aug. 28, 1925.